(12) United States Patent
Hoppe et al.

(10) Patent No.: US 10,012,489 B2
(45) Date of Patent: Jul. 3, 2018

(54) TAPE MEASURE

(71) Applicant: Milwaukee Electric Tool Corporation, Brookfield, WI (US)

(72) Inventors: Christopher S. Hoppe, Milwaukee, WI (US); Steven W. Hyma, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 109 days.

(21) Appl. No.: 15/090,526

(22) Filed: Apr. 4, 2016

(65) Prior Publication Data

US 2016/0290776 A1    Oct. 6, 2016

Related U.S. Application Data

(60) Provisional application No. 62/265,829, filed on Dec. 10, 2015, provisional application No. 62/142,014, filed on Apr. 2, 2015.

(51) Int. Cl.
*G01B 3/10*    (2006.01)

(52) U.S. Cl.
CPC .... *G01B 3/1041* (2013.01); *G01B 2003/1043* (2013.01); *G01B 2003/1048* (2013.01); *G01B 2003/1053* (2013.01)

(58) Field of Classification Search
CPC .... G01B 2003/1043; G01B 2003/1048; G01B 2003/1053; G01B 3/1041
USPC ......................................... 33/760, 768, 769
See application file for complete search history.

(56) References Cited

U.S. PATENT DOCUMENTS

| | | | |
|---|---|---|---|
| 1,485,634 | A | 3/1924 | Shillman |
| 1,703,703 | A | 2/1929 | Anderson |
| 1,987,264 | A | 1/1935 | McMahan |
| 2,035,379 | A | 3/1936 | Stewart |
| 2,051,669 | A | 8/1936 | Zevely et al. |
| 2,099,153 | A | 11/1937 | Walker |
| 2,150,086 | A | 3/1939 | Truman |
| 2,157,024 | A | 5/1939 | Smith |
| 2,201,517 | A | 5/1940 | Bow |

(Continued)

FOREIGN PATENT DOCUMENTS

| | | |
|---|---|---|
| EP | 2276404 | 10/2011 |
| WO | 199941181 | 8/1999 |

(Continued)

OTHER PUBLICATIONS

International Search Report and Written Opinion for Application No. PCT/US2016/025931 dated Jul. 18, 2016 (5 pages).

*Primary Examiner* — Yaritza Guadalupe-McCall
(74) *Attorney, Agent, or Firm* — Reinhart Boerner Van Deuren s.c.

(57) ABSTRACT

A tape measure includes a spool, a housing defining an opening, where the spool is rotatably coupled to the housing, and a blade including a first end and a second end, where the first end is connected to the spool and the second end is movable through the opening between a retracted position and an extended position. The manually retractable tape measure further includes a cleaning assembly positioned within the housing adjacent the opening such that the cleaning assembly is in contact with the blade to push away debris from the blade as the blade moves between the retracted position and the extended position.

16 Claims, 11 Drawing Sheets

(56) References Cited

U.S. PATENT DOCUMENTS

| | | |
|---|---|---|
| 2,424,046 A | 7/1947 | Moore et al. |
| 2,440,571 A | 4/1948 | Bow |
| 2,497,471 A | 2/1950 | Shillman |
| 2,504,563 A | 4/1950 | Menke |
| 2,505,653 A | 4/1950 | Shillman |
| 2,662,700 A | 12/1953 | Higgins |
| 2,779,045 A | 1/1957 | Harvey |
| 2,906,471 A | 9/1959 | Huff |
| 3,731,389 A | 5/1973 | King |
| 4,521,934 A | 6/1985 | Castle |
| 4,583,294 A | 4/1986 | Hutchins et al. |
| 4,852,822 A | 8/1989 | Brady |
| 5,056,180 A | 10/1991 | Stanton |
| 5,448,837 A | 9/1995 | Han-Teng |
| 5,588,220 A * | 12/1996 | Cousins ............ G01B 3/1041 33/761 |
| 5,743,478 A | 4/1998 | Plestan |
| 5,938,140 A | 8/1999 | Fundak |
| 6,175,470 B1 | 1/2001 | Stamm |
| 6,227,475 B1 | 5/2001 | McAllister et al. |
| 6,308,432 B1 | 10/2001 | Gillian et al. |
| 6,996,915 B2 | 2/2006 | Ricalde |
| 7,415,777 B2 | 8/2008 | Campbell et al. |
| 7,584,549 B2 | 9/2009 | Lee et al. |
| 7,987,887 B2 | 8/2011 | Khor et al. |
| 8,468,710 B1 | 6/2013 | Mos |
| 8,567,085 B2 * | 10/2013 | Roeske ............... G01B 3/1041 33/769 |
| 8,819,955 B2 | 9/2014 | Chapin et al. |
| 8,898,922 B2 | 12/2014 | Bridges et al. |
| 9,080,849 B2 | 7/2015 | Steele et al. |
| 2004/0088875 A1 | 5/2004 | Lee et al. |
| 2008/0066333 A1 | 3/2008 | Hernandez |
| 2012/0036727 A1 * | 2/2012 | McCarthy ............ B43K 23/001 33/760 |
| 2012/0167403 A1 * | 7/2012 | Roeske ............... G01B 3/1041 33/769 |
| 2013/0276718 A1 * | 10/2013 | Valadez ............... A01K 27/004 119/796 |
| 2016/0003602 A1 * | 1/2016 | Zelenack, Jr. ....... G01B 3/1041 33/769 |
| 2016/0290776 A1 * | 10/2016 | Hoppe ................ G01B 3/1041 |

FOREIGN PATENT DOCUMENTS

| | | |
|---|---|---|
| WO | 2004031683 | 4/2004 |
| WO | 2005121694 | 12/2005 |

* cited by examiner

TAPE MEASURE

BACKGROUND

The present invention relates to tape measures. More specifically, the present invention relates to an open reel-type tape measure with a self-cleaning assembly.

Open reel-type tape measures are a type of manually retractable tape measure. Open reel-type tape measures are often used to take long measurements. For example, many open reel tape measures include 100 feet or more of tape whereas a conventional tape measure includes no more than about 35 feet of tape. Unlike conventional tape measures, manually retractable tape measures, such as an open reel tape measures, often does not include a biasing member that automatically retracts the tape. Rather, the user must manually retract the tape. In addition, these tape measures are commonly used in environments where dust and debris are present. Often dust and debris can gather on the tape measure which may eventually lead to a jam. Debris can also collect within the tape measure housing and interfere with the working parts of the tape measure.

SUMMARY

In one construction, the invention provides a tape measure including a cleaning assembly.

In another construction, the invention provides a tape measure including a spool, a housing defining an opening where the spool is rotatably coupled to the housing, and a blade including a first end and a second end, in which the first end is connected to the spool and the second end is movable through the opening between a retracted position and an extended position. The manually retractable tape measure further includes a cleaning assembly positioned within the housing adjacent the opening such that the cleaning assembly is in contact with the blade to push away debris from the blade as the blade moves between the retracted position and the extended position.

In another construction, the invention provides a tape measure including a spool, a housing having a first side and a second side that cooperate to define a housing interior and an opening, a gear assembly coupled to the spool and the housing to enable rotation of the spool with respect to the housing, and a blade including a first end attached to the spool and a second end that extends through the opening and is movable between a retracted position and an extended position. The manually retractable tape measure further includes a wiper disposed within the housing interior and including a cleaning portion, a first tubular portion that extends from the cleaning portion in a first direction, and a second tubular portion that extends from the cleaning portion in a second direction opposite the first direction. The first tubular portion is supported by the first side of the housing and the second tubular portion is supported by the second side of the housing to position the cleaning portion into direct contact with the blade as the blade moves between the retracted position and the extended position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
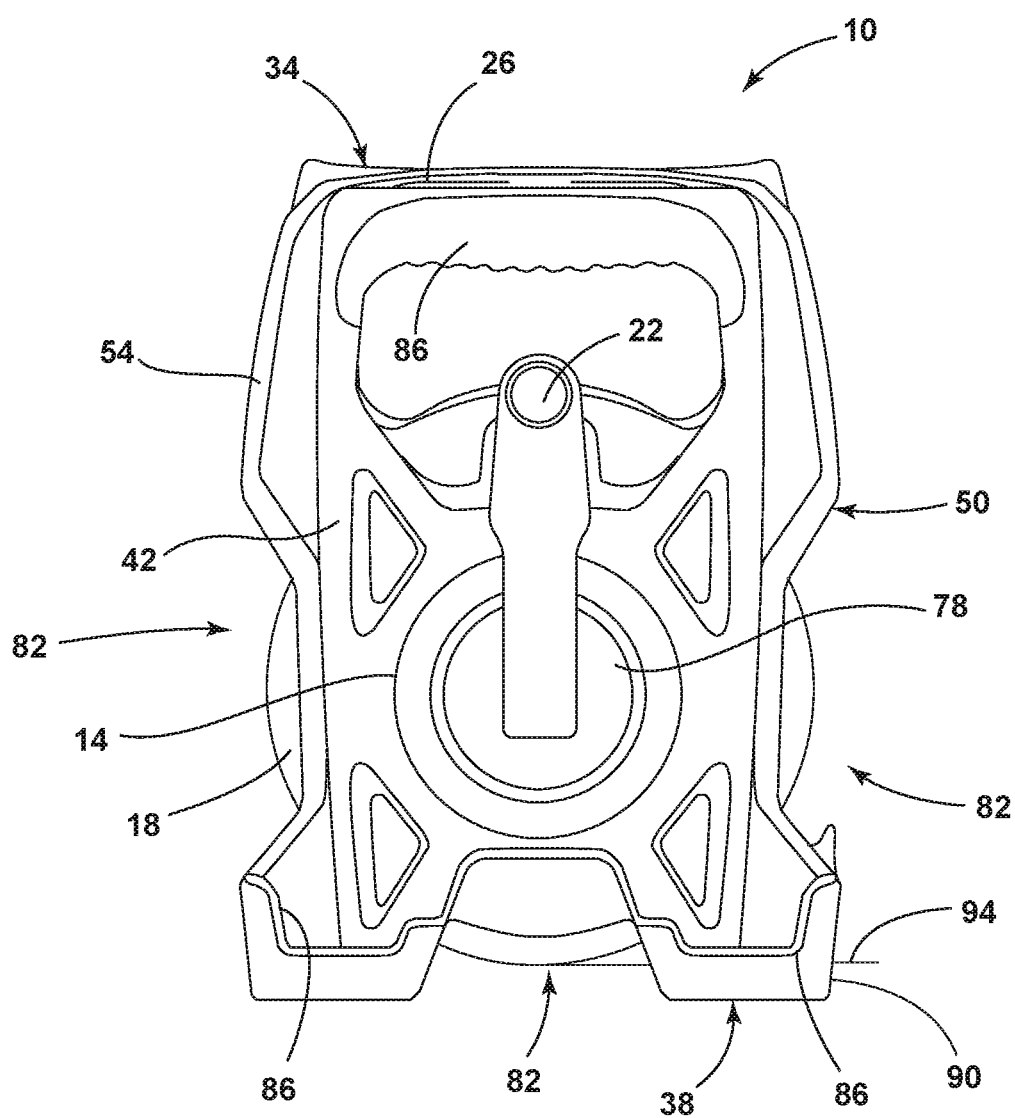
FIG. 1 is a front view of a tape measure.
Figure 2:
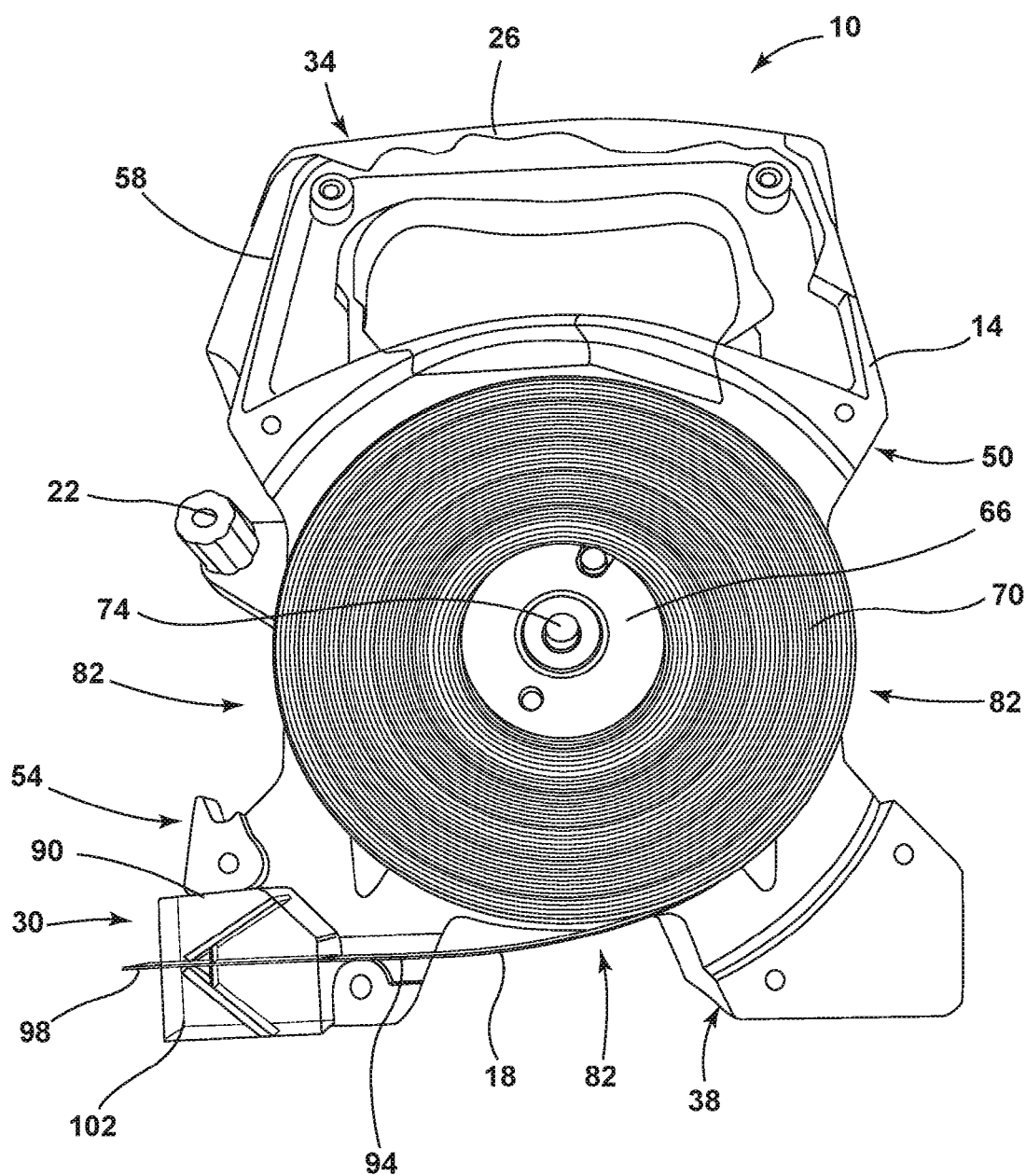
FIG. 2 is a partially disassembled view of the tape measure of FIG. 1.

FIGS. 1 and 2 illustrate a tape measure 10 that includes a housing 14, a tape blade 18, a crank arm 22, a handle 26, and a cleaning assembly 30. The tape measure 10 is a manually retractable tape measure with an open reel. The housing defines a top 34, a bottom 38, a front 42, a back 46, and two sides 50, 54. The housing 14 further includes an interior and an exterior. In the illustrated construction, the housing 14 is formed from two shells 58, 62 that attach to one another along a seam to complete the housing 14. A tape blade 18 is positioned between the shells 58, 62. The blade 18 includes a first side and a second side that opposes the first side. The first side and the second side of the blade extend between a first end and a second end. The tape blade 18 is wound onto a spool 66 to define a tape reel 70. The spool 66 is rotatably coupled to the housing 14 by a post 74 that extends between the shells 58, 62 along a rotational axis of the spool 66. The spool 66 is further coupled to a crank arm 22 by a gear assembly 78. Rotation of the crank arm 22 causes the spool 66 to rotate and the tape blade 18 to either extend or retract depending on the direction the crank arm 22 is rotated. The crank arm 22 is typically manually rotated. The crank arm 22 is coupled to the spool 66 by the gear assembly 78 preferably having at least a 3 to 1 gear ratio. A clutch is also provided to inhibit rotation of the crank arm 22 as the tape is retracted and/or to inhibit rotation of the gears 78 when the mechanism is jammed. The gear ratio allows for the tape blade 18 to be retracted at a faster speed with fewer rotations of the crank arm 22. The gear assembly 78 can also have another gear ratio that allows for a faster speed of rotation. For example, in some embodiments, the gear ratio is greater than 3 to 1 (e.g., 6 to 1).

With continued reference to FIGS. 1 and 2, the tape measure 10 includes a handle 26 formed on the top 34 of the housing 14 that allows a user to hold the tape measure 10 with one hand and rotate the crank arm 22 with the other hand. The handle 26 includes an ergonomic design that allows for easy measurements. The housing 14 further includes spike storage that enables storage of one or more spikes for single person operation. The spikes are arranged to attach to the tape blade 18 and can be embedded in the ground or otherwise attached to objects to fix the end of the tape, thereby allowing a single user to take a measurement. Together the handle 26 and the rest of the housing 14 form concave portions 82 on the sides 50, 54 and bottom 38 of the housing 14. The concave portions 82 enable the tape measure 10 to be rested on a surface while still allowing the tape blade 18 to be extended or retracted without the blade 18 touching the surface. The handle 26 and the housing 14 are formed from materials and constructions that provide high drop durability. The drop durability is further increased by incorporating resilient pieces 86 along the corners of the tape measure 10 to receive the brunt of a dropping force. In addition, the resilient pieces 86 can be placed along the handle 26 to increase friction when the tape measure is resting on the resilient pieces 86. While the tape measure described herein is directed to a manually retractable tape measure, it should be understood that the following features may be used in conjunction with a spring loaded retractable tape measure.

Figure 3:
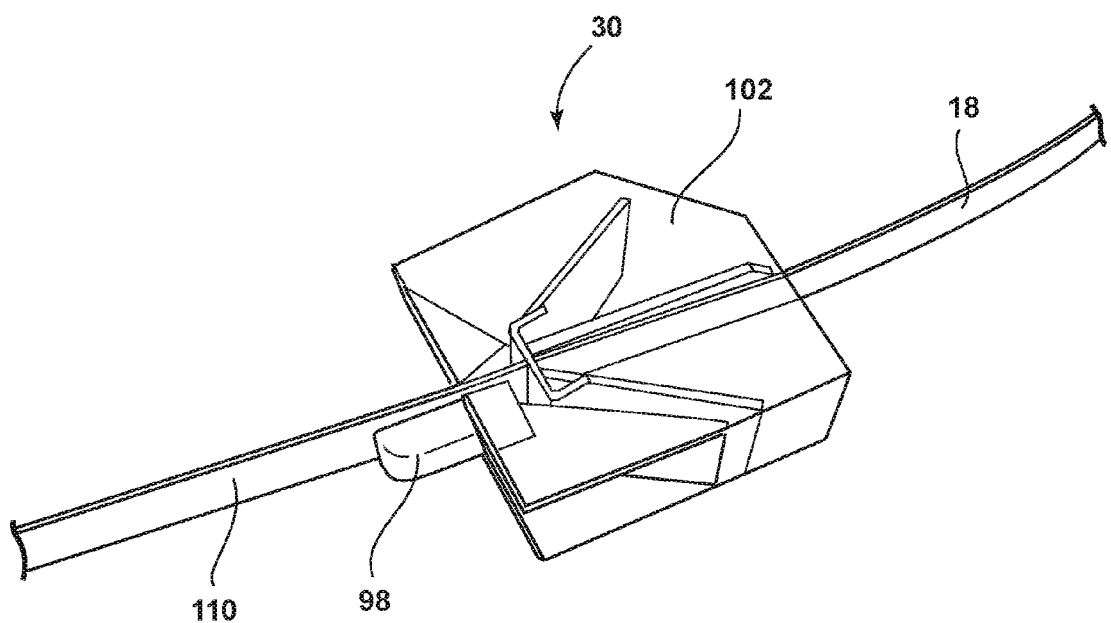
FIG. 3 is a detailed view of a cleaning device according to one embodiment without a tape measure housing.
Figure 4:
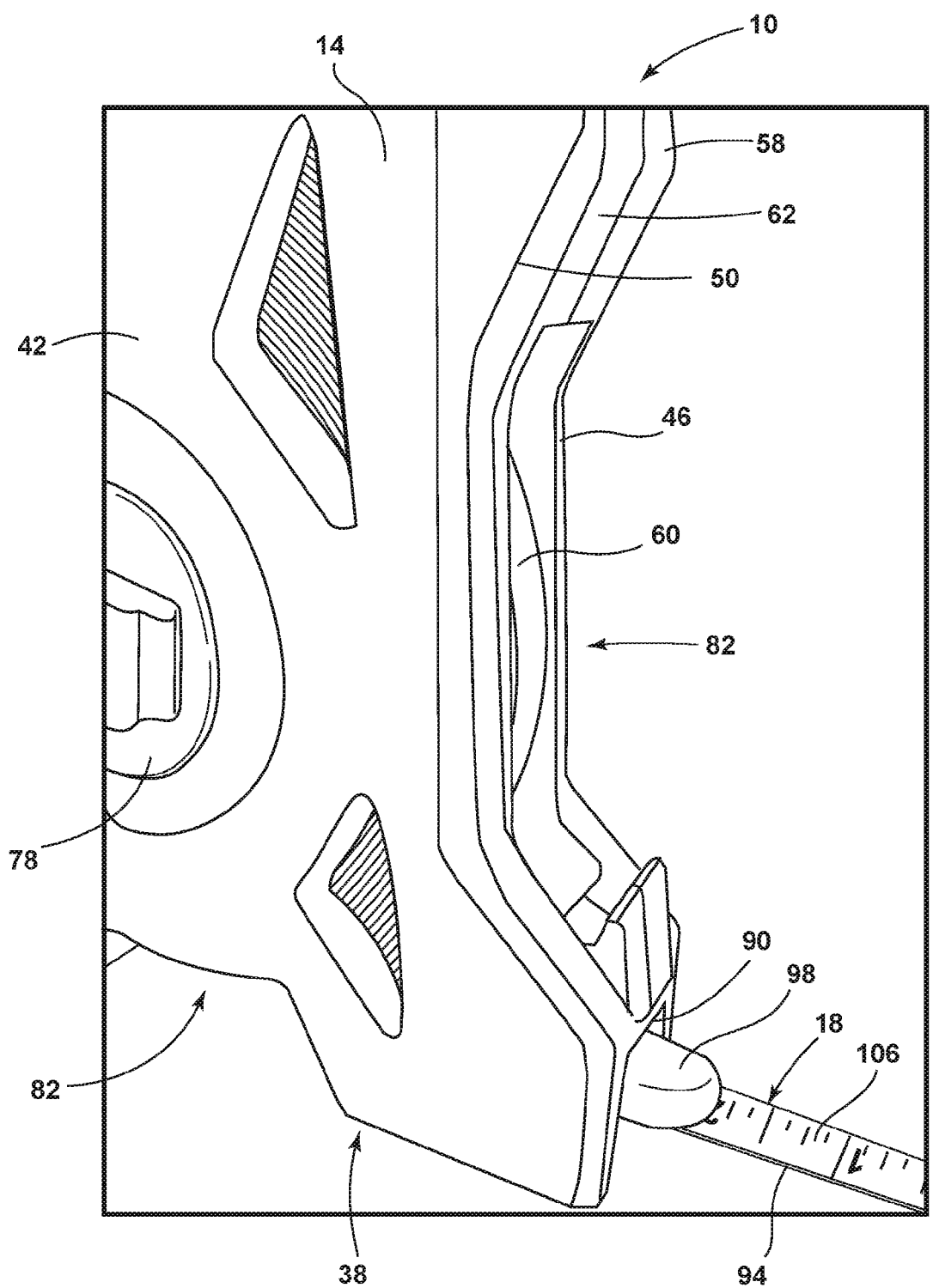
FIG. 4 is a partial perspective view of the tape measure of FIG. 1.

As illustrated in FIGS. 2 and 4, the blade 18 extends from an opening 90 in the housing 14. The tape blade 18 includes a leading end 94 that exits the opening 90 of the housing 14 first when the blade 18 is being extended and enters the opening 90 of the housing 14 last when the blade 18 is being retracted. The opening 90 is located at a bottom quadrant of the housing 14. A cleaning assembly 30 is positioned inside the housing 14 just behind the opening 90. In other embodiments, the cleaning assembly 30 is positioned on the outside of the housing 14 adjacent the opening 90. The cleaning assembly 30 removes dust and debris from the tape blade 18 when the tape blade 18 is retracted into the housing 14 or as the blade 18 is extracted from the housing 14. As shown in FIGS. 3 and 4, the cleaning assembly 30 includes resilient wipers 98 and a casing 102. The wipers 98 are at least partially contained in the casing 102, which holds the wipers 98 at an angle directed towards the tape blade 18. The wipers 98 contact a top side 106 and a bottom side 110 of the tape blade 18 to clean the tape blade 18. In other embodiments, there is a small gap between the wipers 98 and the blade 18 to prevent excessive resistance on the blade 18 while the blade 18 is retracting. The wipers 98 extend through the opening 90 of the housing 14. As the blade 18 retracts, the blade 18 slides between wipers 98 and the wipers 98 push away unwanted debris before the blade 18 enters the opening 90 of the housing 14. The wipers 98 can be made using a variety of materials, including but not limited to, plastic, rubber, silicon, fabric, bristles, wire mesh, or a combination thereof. In some embodiments, the cleaning assembly 30 can be a replaceable insert, while in other embodiments the cleaning assembly 30 can be permanently fixed to the housing 14. The cleaning assembly 30 can also include a cleaning solution to further clean the tape blade 18. In these constructions, a fluid reservoir holds a quantity of fluid and directs fluid to the cleaning assembly 30 or wipers 98. Variations of the tape measure described with respect to FIGS. 2-4 can also be incorporated into the tape measure shown in FIGS. 5-7 and 10-11, and vice versa.

Figure 5:
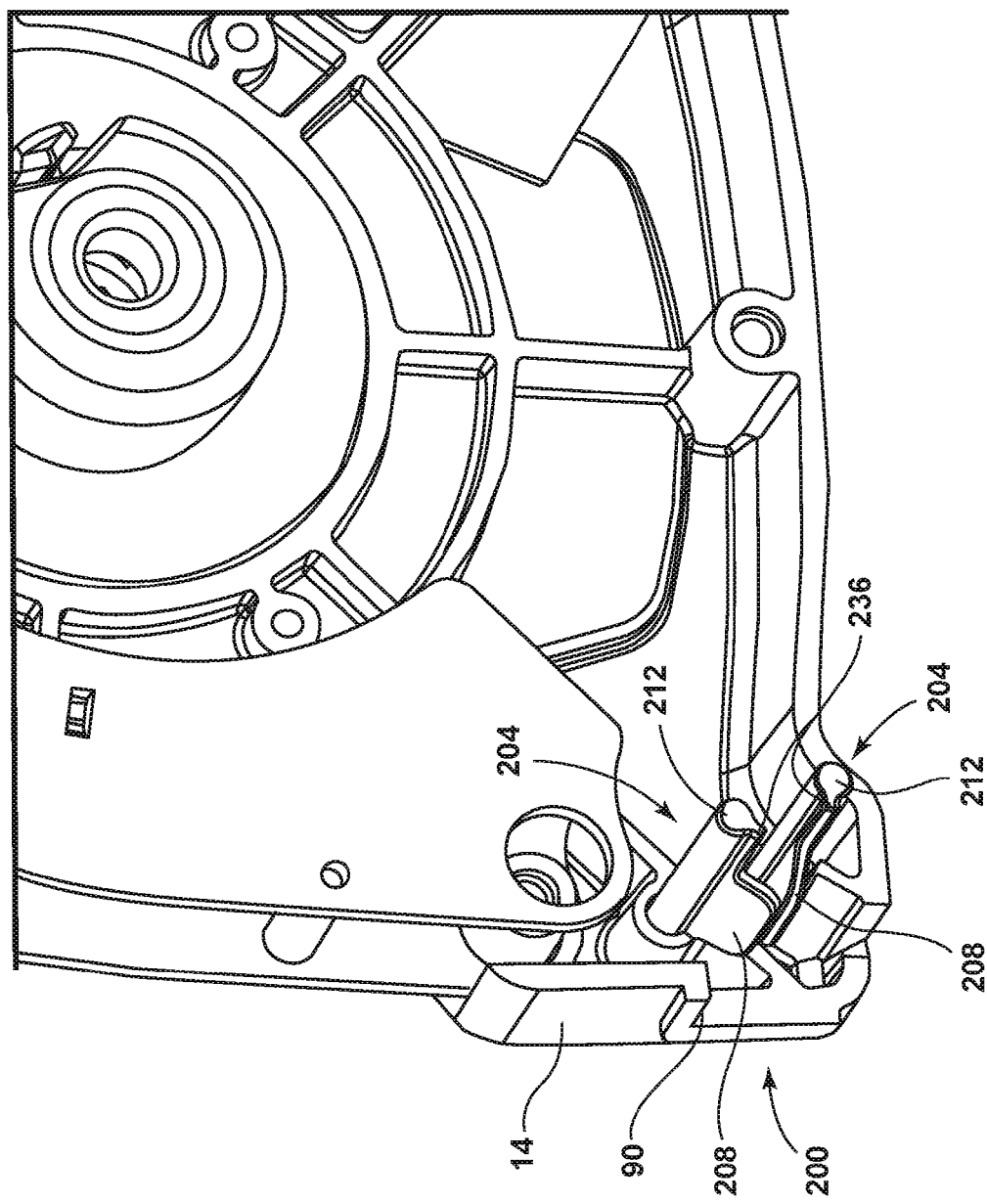
FIG. 5 is a partial perspective view of another embodiment of a cleaning device with a portion of the housing removed.
Figure 6:
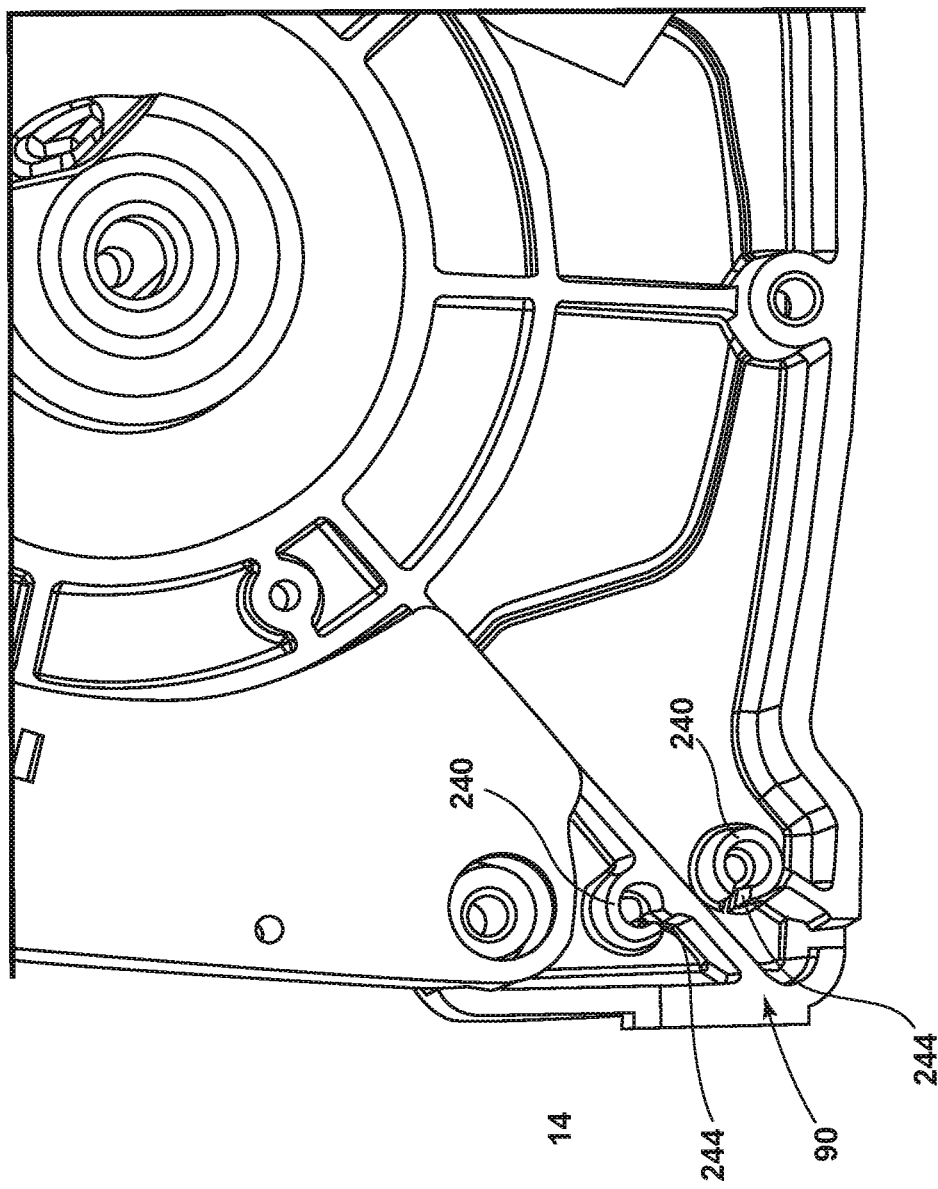
FIG. 6 is a detailed view of the tape housing according to the embodiment of FIG. 5.
Figure 7:
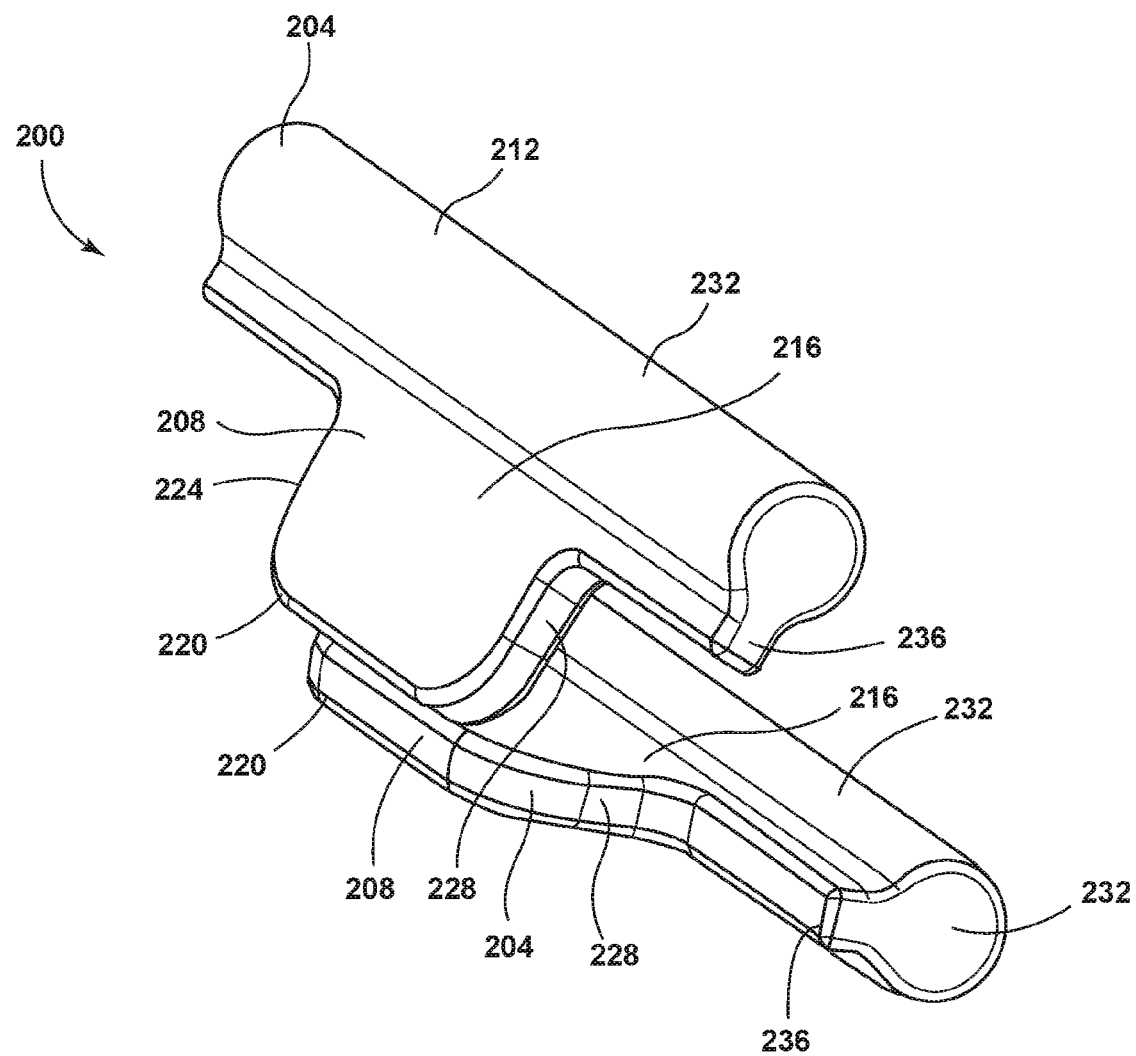
FIG. 7 is a perspective view of the cleaning device of FIG. 5.

FIGS. 5-7 illustrate another embodiment of a cleaning assembly 200. The cleaning assembly 200 of this embodiment includes two wipers 204 that inhibit debris from entering the tape housing 14. In other embodiments, greater or fewer wipers 204 may be used. Similar to the first embodiment, the wipers 204 are positioned proximate the opening 90 and are contained within the housing 14. The wipers 204 each include a cleaning portion 208 and an attachment portion 212. The cleaning portion 208 is generally flat and defines a plate-like structure having a proximal end 216, a distal end 220, a left side 224, and a right side 228. The distal end 220 of each wiper 204 contacts the tape blade 18 to remove debris. The proximal end 216 of each wiper 204 connects to the attachment portion 212. The attachment portion 212 of each wiper 204 defines a tubular body 232 that extends along the proximal end 216 of the cleaning portion 208. The attachment portion 212 extends beyond both the left and right sides 224, 228 of the cleaning portion 208. The attachment portion 212 further includes a key 236 extending radially outward from the tubular body 232. The key 236 also extends along at least a portion of the length of the tubular body 232.

The wipers 204 are held in place within the tape housing 14 by the attachment portion 212 and the tape housing 14. As illustrated in FIG. 6, the attachment portion 212 of the wipers 204 engages with slots 240 in the housing 14. Specifically, the slots 240 are c-shaped such that each slot includes a key hole 244. The key holes 244 receive the key 236 of each wiper 204, respectively. Engagement of the keys 236 by the key holes 244 maintains the angle of the wipers 204 and prevents the wipers 204 from rotating within the housing 14 as the tape blade 18 retracts or extends. In other embodiments, the cleaning portion 208 functions as the key 236. In this embodiment, the plate-like structure of the cleaning portion 208 is received by the key holes 244 to prevent the wipers 204 from rotating.

The housing 14 maintains the wipers 204 at an angle relative to one another. A top wiper 204 is positioned above the blade 18 (not shown in FIGS. 5-7) such that the distal end 220 of the cleaning portion 208 contacts the blade 18 on the top side 106. A bottom wiper 204 is positioned below the blade 18 such that the distal end 220 of the cleaning portion 208 contacts the blade 18 on the bottom side 110.

The cleaning assembly 30 helps limit the amount of dust and debris that enters the tape measure housing 14 or that remains on the blade 18 as the blade 18 is wound. When dust and debris enter the housing 14 it can interfere with the mechanical parts of the tape measure 10 and cause the tape measure 10 to jam. Additionally, if the tape blade 18 has debris between each layer as it winds around the spool 66, the overall diameter of the tape reel 70 will expand. This can cause the tape blade 18 to jam within the housing. This debris can damage the surface of the tape.

Figure 11:
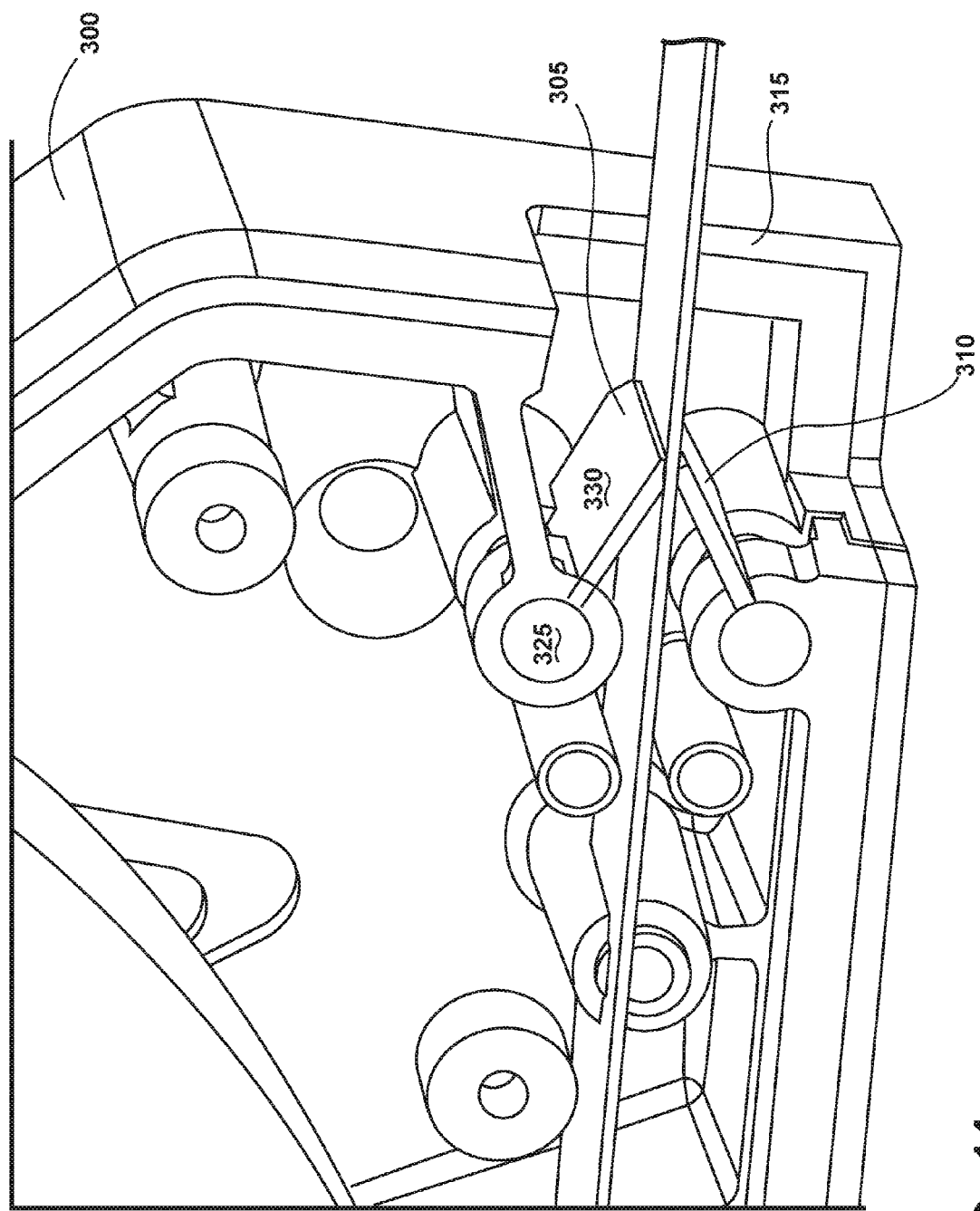
FIG. 11 is an enlarged perspective view of a portion of the long reel tape measure of FIG. 10.

In addition, the housing 14 can be configured to help prevent debris from entering through the opening 90. As shown in FIG. 11, the housing 14 can include closed walls above or behind the wipers 204 to ensure that debris does not enter the housing 14 after being wiped off of the blade 18 (e.g., the wall immediately above the upper wiper 204). The housing 14 can also be shaped so that there are no housing walls below the wipers 204 so debris that is pushed off of the blade 18 by the wipers 204 does not fall into the housing, but instead falls onto the ground. Additionally, the opening 90 of the housing 14 surrounding the wipers 204 can be large and open to allow for easy access from the outside of the housing 14 to allow a user to clear off debris or water that is caught by the closed walls above or behind the wiper.

Figure 8:
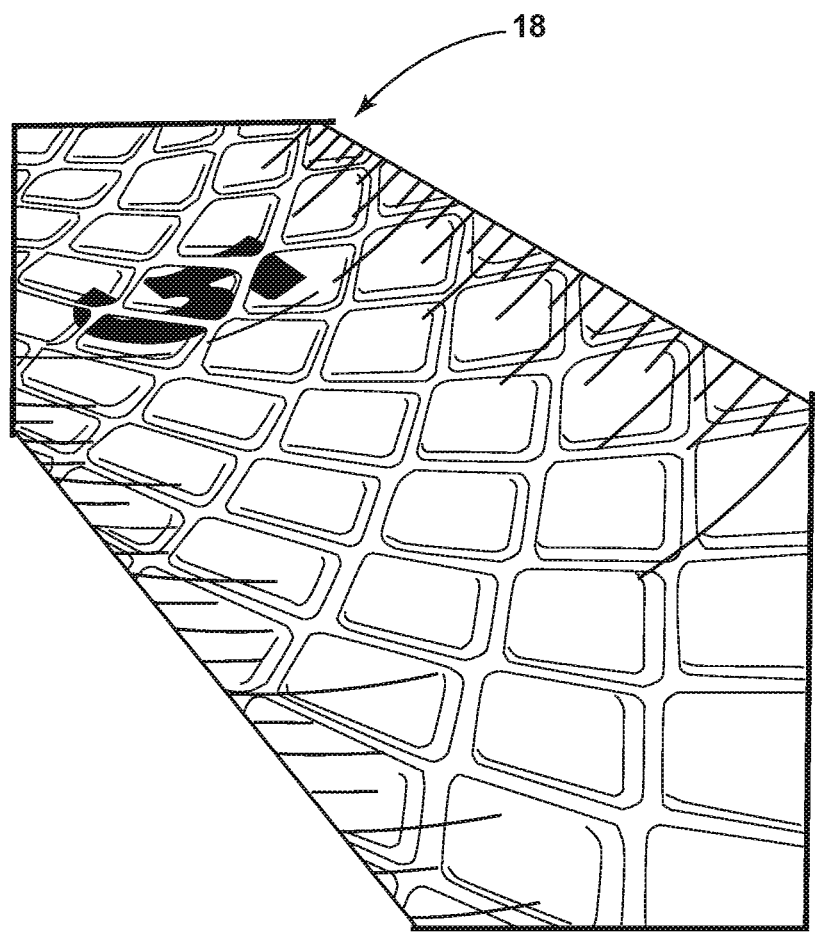
FIG. 8 is a schematic illustration of a coating for a tape blade.

With reference to FIG. 8, additional features can aid in keeping the tape measure 10 cleaner and free from debris. For example, the blade 18 is provided with a waterproof coating that whisks away water and other contaminants. As illustrated in FIG. 8, the tape blade 18 includes additional features that help maintain the integrity of the blade 18. The tape blade 18 includes a nylon clad steel blade that is about one-half inch in width with other arrangements and widths being possible. The illustrated blade 18 includes dual sided printing, imperial on top, and a ¹/₁₀ engineers scale on the bottom. A tape tear solution is also incorporated into the tape blade 18. The tape tear solution provides an extra coating on the blade to reduce the likelihood of tearing. As illustrated, the tape tear coating is provided on at least the last foot of the tape blade 18 toward the leading end 94 of the tape blade 18 where tearing is most likely to occur. The tape tear solution could include a layer of nylon or another material.

Figure 9:
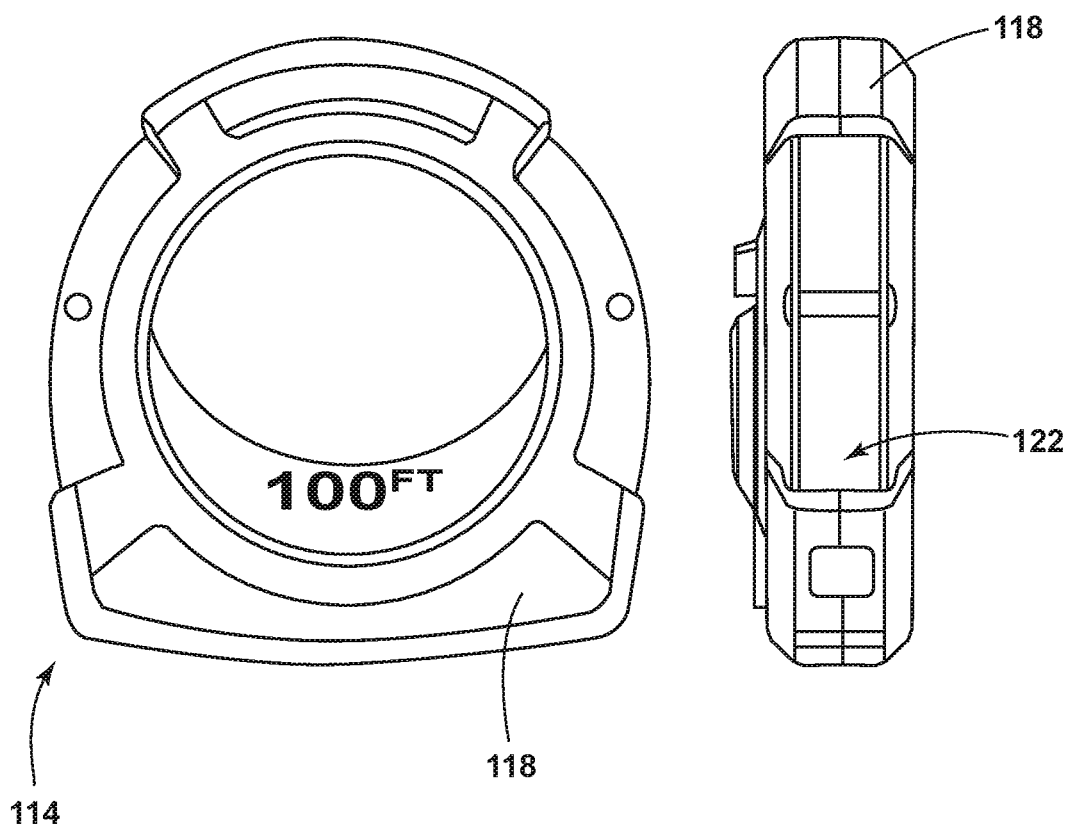
FIG. 9 is a front view and a side view of another tape measure.

In addition, the tape measure 10 may include features to help maintain the accuracy of the measurements acquired with the tape measure 10. The blade 18 is an anti-stretch blade 18 with up to 30 percent less stretch than prior tape measure blades. Also, as illustrated in FIGS. 1 and 9, the tape measure 10 includes an accuracy scale. The scale informs a user of the accuracy of the tape measurement 10 based on the current temperature. If the temperature is warm or cold enough to alter the length of the tape blade 18, the accuracy scale will inform the user that the measurement is over or under an accurate measurement and can provide an adjustment based on the actual temperature.

In another embodiment (FIG. 9), a tape measure 114 includes a housing 118 with an open frame 122 for contamination control.

The tape measures illustrated in FIGS. 5, 6, and 9 include housings that substantially enclose the tape when it is retracted into the housing. The construction of FIG. 9 does include an open portion that provides for additional contamination control by allowing for easy cleaning and removal of any debris that might adhere to the tape.

Figure 10:
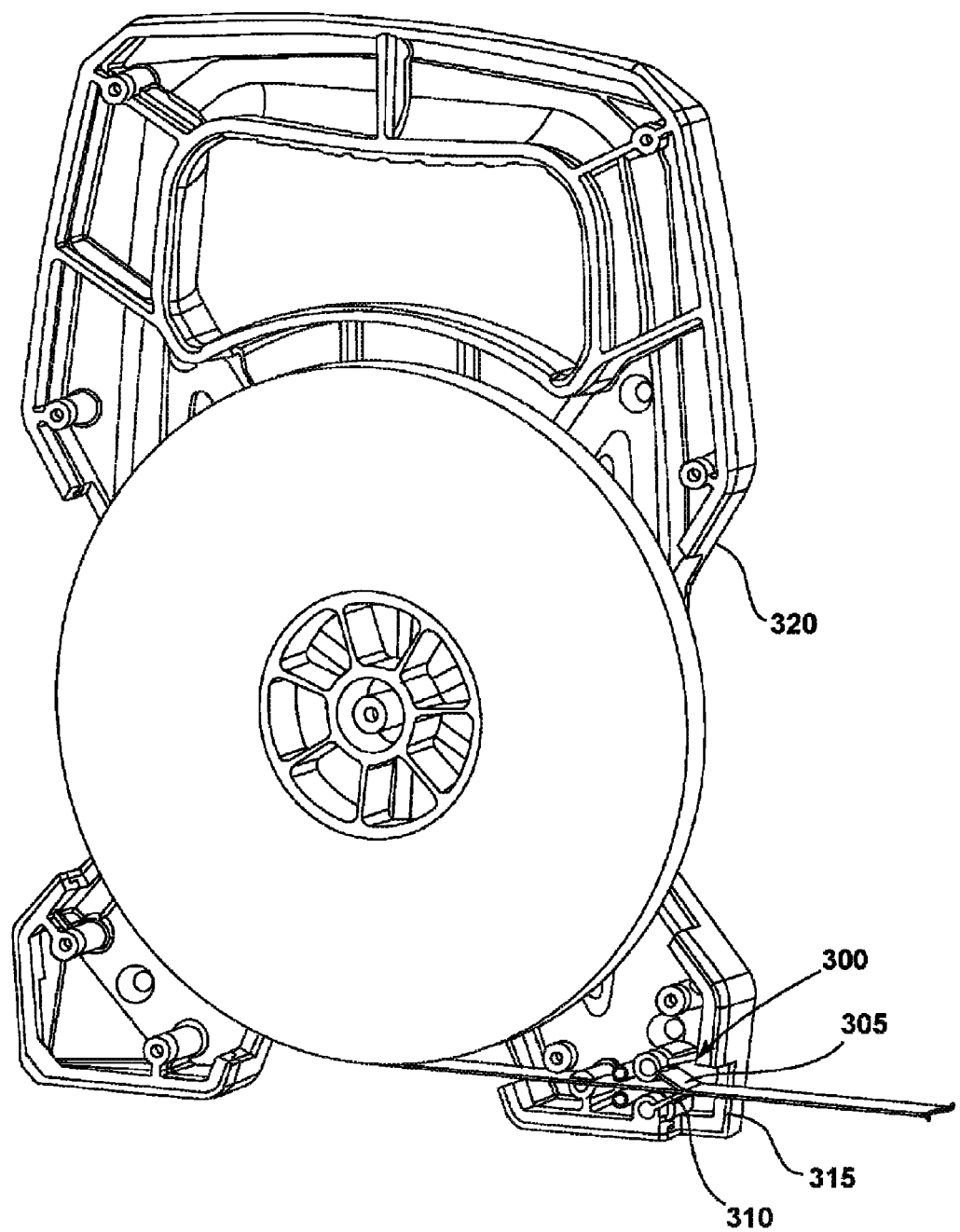
FIG. 10 is a perspective view of a long reel tape measure.

FIGS. 10 and 11 illustrate a long reel open frame tape measure that includes a cleaning assembly 300 similar to the cleaning assembly 200 illustrated in FIGS. 5 and 6. As illustrated in FIG. 10, the cleaning assembly 200 includes a first wiper 305 and a second wiper 310 positioned near an opening 315 in a tape measure housing 320. The opening 315 provides a passage for the tape to pass through during extension and retraction.

With reference to FIG. 11, the wipers 305, 310 include a cylindrical shaft portion 325 and a rectangular plate member 330 extending radially outward from the shaft portion 325 and along the long axis of the shaft portion 325. The shaft portion 325 is sized and arranged to be received within a cylindrical aperture formed in the housing 320. In the illustrated embodiment, the aperture is formed in a boss protruding from the housing 320. A slot, also formed in the housing 320 is positioned to receive the plate member 330 and inhibit rotation of the wipers 305, 310 with respect to the housing 320. The slot is also arranged so that the plate members 330 extend toward the housing opening 315 and such that they are obliquely or acutely angled with respect to the tape or blade. In the illustrated embodiment, the slot is positioned along a circumference of the boss. In one construction, the plate members are arranged at an acute angle with respect to the tape. For example, in one embodiment, the plate members can be arranged at a 30 degree angle with respect to the tape, with other angles being possible. A tape contacting end of each plate member 330 includes an angled surface that is arranged to be substantially parallel with the tape as it passes between the wipers 305, 310. Thus, in the above example, the angled surface defines a 30 degree angle with respect to the surface of the plate member 330. Of course, other arrangements may utilize different angles for the wiper with preferred designs having a range between 10 and 60 degrees with more preferred designs being between 15 and 45 degrees.

In operation, the wipers 305, 310 engage the top and bottom surfaces of the tape as it is extended out of the housing 320 and contacts the tape as it is retracted back into the housing 320. The wipers 305, 310 are closely spaced so that they remain in tight or close contact with both sides of the tape as the tape moves between them. The wipers 305, 310 disengage debris that might be stuck to the tape before the tape is wound in the housing 320. As the debris is removed, it falls below the wipers 305, 310 and out of the housing 320.

Although the invention has been described with reference to certain preferred embodiments, variations and modifications exit within the spirit and scope of the present invention. Various features and advantages of the invention are set forth in the following claims.

What is claimed:

1. A tape measure comprising:
a spool;
a housing defining an opening, the spool rotatably coupled to the housing;
a blade including a first end and a second end, the first end connected to the spool and the second end movable through the opening between a retracted position and an extended position; and
a cleaning assembly positioned within the housing adjacent the opening, the cleaning assembly in contact with the blade to push away debris from the blade as the blade moves between the retracted position and the extended position;
wherein the cleaning assembly includes a first wiper and a second wiper;
wherein the first wiper includes a cleaning portion and an attachment portion, and wherein the attachment portion directly engages the housing to attach the first wiper to the housing;
wherein the housing includes a boss protruding from the housing and having a cylindrical aperture and a slot disposed along a circumference of the boss, and wherein a shaft portion of the first wiper is received within the cylindrical aperture and the plate member extends through the slot.

2. The tape measure of claim 1, wherein the blade includes a first surface and a second surface opposing the first surface, and wherein the first wiper contacts the first surface of the blade and the second wiper contacts the second surface of the blade.

3. The tape measure of claim 2, wherein the first wiper includes an angled surface that is arranged to be substantially parallel to the first surface of the blade as the blade moves between the retracted position and the extended position.

4. The tape measure of claim 1, wherein the attachment portion defines a tubular body, and wherein the cleaning portion defines a plate member that extends radially outward from the tubular body.

5. The tape measure of claim 1, wherein the attachment portion defines an attachment width that extends beyond a width of the cleaning portion.

6. The tape measure of claim 1, wherein the attachment portion includes a first side that extends from the cleaning portion in a first direction and a second side extending from the cleaning portion in a second direction opposite the first direction, and wherein both the first side and the second side of the attachment portion are coupled to the housing.

7. The tape measure of claim 1, wherein the first wiper is coupled to the housing in a fixed position, and wherein the cleaning portion of the first wiper forms an acute angle with the blade.

8. The tape measure of claim 7, wherein the first wiper is arranged at a 30 degree angle with the blade.

9. A tape measure comprising,
a spool;
a housing having a first side and a second side that cooperate to define a housing interior and an opening;
a gear assembly coupled to the spool and the housing to enable rotation of the spool with respect to the housing;
a blade including a first end attached to the spool and a second end that extends through the opening and is movable between a retracted position and an extended position; and
a wiper disposed within the housing interior and including a cleaning portion, a first tubular portion that extends from the cleaning portion in a first direction, and a second tubular portion that extends from the cleaning portion in a second direction opposite the first direction, the first tubular portion supported by the first side of the housing and the second tubular portion supported by the second side of the housing to position the cleaning portion into direct contact with the blade as the blade moves between the retracted position and the extended position.

10. The tape measure of claim 9, wherein the gear assembly defines a gear ratio of at least 3 to 1.

11. The tape measure of claim 9, wherein the cleaning portion includes a plate member that extends toward the opening at an acute angle with respect to the blade.

12. The tape measure of claim 11, wherein the plate includes an angled end surface that defines a planar portion that directly contacts the blade.

13. The tape measure of claim 9, wherein the blade includes a top surface and a bottom surface and wherein the cleaning portion is in direct contact with the top surface of the blade.

14. The tape measure of claim 13, wherein the wiper is a first wiper, and wherein a second wiper is connected to the housing and includes a second cleaning portion in direct contact with the bottom surface of the blade.

15. The tape measure of claim 14, wherein the blade defines a mirror plane and the second wiper is a mirror image of the first wiper with respect to the mirror plane.

16. A tape measure comprising,
a spool;
a housing having a first side and a second side, the housing defining a housing interior and an opening;
a gear assembly coupled to the spool and the housing such that the spool is rotatable with respect to the housing;
a blade including a first end attached to the spool and a second end that extends through the opening and is movable between a retracted position and an extended position; and
a wiper coupled to the housing, the wiper including a cleaning portion, a first attachment portion that extends from the cleaning portion in a first direction and a second attachment portion that extends from the cleaning portion in a second direction opposite the first direction, the first attachment portion supported by the first side of the housing and the second attachment portion supported by the second side of the housing, wherein the cleaning portion is positioned in direct contact with the blade as the blade moves between the retracted position and the extended position.

* * * * *